United States Patent
Iizaka

(10) Patent No.: US 10,360,690 B2
(45) Date of Patent: Jul. 23, 2019

(54) INFORMATION PROCESSING APPARATUS AND INFORMATION PROCESSING METHOD

(71) Applicant: TOSHIBA TEC KABUSHIKI KAISHA, Tokyo (JP)

(72) Inventor: Hitoshi Iizaka, Fuji Shizuoka (JP)

(73) Assignee: Toshiba TEC Kabushiki Kaisha, Tokyo (JP)

(*) Notice: Subject to any disclaimer, the term of this patent is extended or adjusted under 35 U.S.C. 154(b) by 30 days.

(21) Appl. No.: 15/839,567

(22) Filed: Dec. 12, 2017

(65) Prior Publication Data

US 2018/0174313 A1 Jun. 21, 2018

(30) Foreign Application Priority Data

Dec. 20, 2016 (JP) .................. 2016-246968

(51) Int. Cl.
| | |
|---|---|
| G06K 9/00 | (2006.01) |
| G06T 7/33 | (2017.01) |
| G06T 1/00 | (2006.01) |
| G06F 3/0484 | (2013.01) |
| G06F 16/10 | (2019.01) |
| G06F 16/583 | (2019.01) |

(52) U.S. Cl.
CPC .......... *G06T 7/337* (2017.01); *G06F 3/04842* (2013.01); *G06F 16/10* (2019.01); *G06K 9/00* (2013.01); *G06K 9/00771* (2013.01); *G06T 1/0007* (2013.01); *G06F 16/583* (2019.01); *G06K 2209/17* (2013.01); *G06T 2207/30128* (2013.01)

(58) Field of Classification Search
CPC .... G06F 16/10; G06F 16/583; G06F 3/04842; G06K 2209/17; G06K 9/00; G06K 9/00771; G06T 1/0007; G06T 2207/30128; G06T 7/337
See application file for complete search history.

(56) References Cited

U.S. PATENT DOCUMENTS

| | | | |
|---|---|---|---|
| 2013/0103509 A1 | 4/2013 | Naito et al. | |
| 2014/0355838 A1* | 12/2014 | Miyakoshi | G06K 9/46 382/106 |
| 2015/0023555 A1* | 1/2015 | Okamura | G07G 1/0054 382/103 |
| 2015/0193668 A1* | 7/2015 | Fukuda | G06Q 20/208 705/23 |
| 2016/0180174 A1* | 6/2016 | Enomoto | G06K 9/00771 704/275 |
| 2016/0180509 A1* | 6/2016 | Sato | G06Q 20/208 382/103 |

* cited by examiner

*Primary Examiner* — Xin Jia
(74) *Attorney, Agent, or Firm* — Kim & Stewart LLP

(57) ABSTRACT

In accordance with an embodiment, an information processing apparatus includes an image pickup device, a storage device, an operation device, and a processor. The operation device receives selection as to whether to register a feature amount of a reference commodity in a first dictionary file or register a feature amount of an exclusion object in a second dictionary file. The processor extracts a feature amount of an object included in a picked-up image output by the image pickup device. Further, the processor registers the extracted feature amount in the first dictionary file or the second dictionary file in accordance with the selection received by the operation device.

14 Claims, 13 Drawing Sheets

| OBJECT ID | OBJECT NAME | FEATURE AMOUNT |
|---|---|---|
| ZZZZ | HAND | ZZZZ |
| ⋮ | ⋮ | ⋮ |

F2

Fig.4

INFORMATION PROCESSING APPARATUS AND INFORMATION PROCESSING METHOD

CROSS-REFERENCE TO RELATED APPLICATION

This application is based upon and claims the benefit of priority from the prior Japanese Patent Application No. 2016-246968, filed on Dec. 20, 2016, the entire contents of which are incorporated herein by reference.

FIELD

An embodiment described here generally relates to an information processing apparatus and an information processing method.

BACKGROUND

In the related art, there is a technology relating to object recognition. In this technology, a feature amount of an object or article included in a picked-up image is compared with a feature amount of a reference object which is registered in a dictionary in advance, and a type or the like of the object is recognized on the basis of a degree of similarity thereof. Further, there has been proposed an information processing apparatus that identifies identifiers and kinds of commodities such as fruits and vegetables by using this technology, and performs sales registration of the commodities on the basis of the identification results.

By the way, in the information processing apparatus that performs sales registration of commodities, if the use environment such as a place where and a season when it is used changes, objects to be recognition targets and objects to be excluded from the recognition targets can also change. In such a case, those new objects cannot be handled with a dictionary prepared in advance. Therefore, it is necessary to register feature amounts of the new objects in the dictionary. However, with the technology of the prior art, it is impossible to easily register the new objects in the dictionary.

In other words, it is time-consuming to register the new objects in the dictionary. Thus, improvements are desirable for convenience.

BRIEF DESCRIPTION OF THE DRAWINGS

FIG. 4 is a conceptual diagram illustrating a data configuration of a dictionary file for exclusion according to the embodiment.

DETAILED DESCRIPTION

Figure 1:
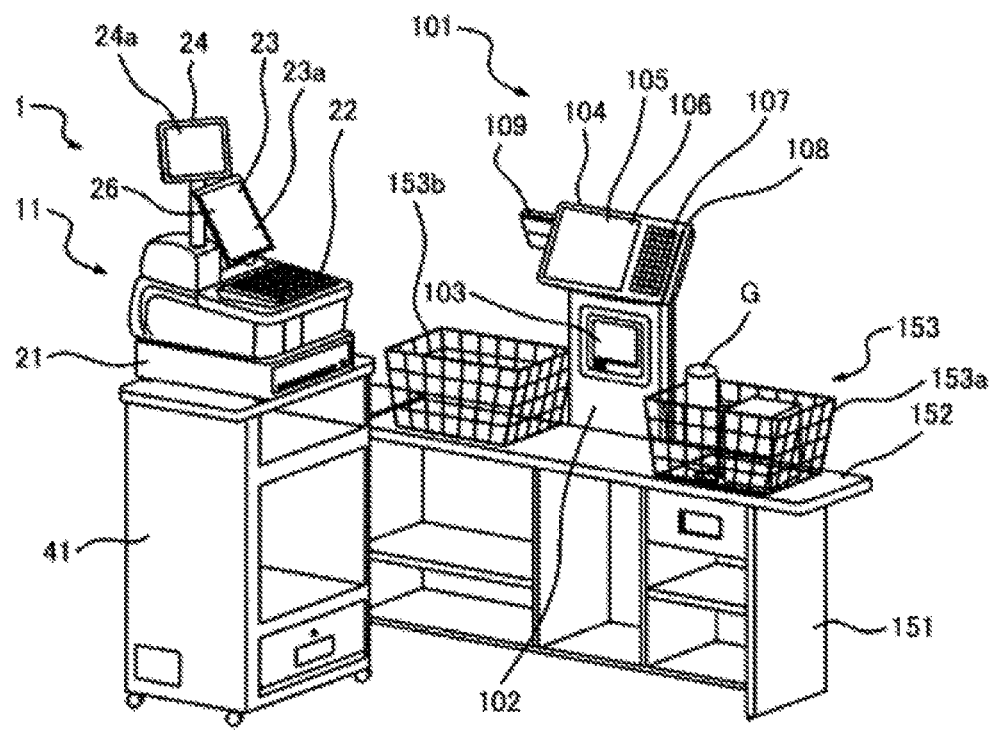
FIG. 1 is a perspective view showing an example of a check-out system according to an embodiment.

In accordance with an embodiment, an information processing apparatus recognizes a commodity and processes information about the recognized commodity. The information processing apparatus includes an image pickup device, a storage device, an operation device, and a processor. The image pickup device picks up an image of an object within an image pickup range and outputs the picked-up image for recognizing a commodity. The storage device stores a first dictionary file in which a feature amount of each of a plurality of reference commodities to be recognition targets is registered and a second dictionary file in which a feature amount of each of a plurality of exclusion objects to be excluded from the recognition targets is registered. The operation device receives selection as to whether to register the feature amount of the reference commodity in the first dictionary file or register the feature amount of the exclusion object in the second dictionary file. The processor extracts a feature amount of the object included in the picked-up image output by the image pickup device. In addition, the processor registers the extracted feature amount in the first dictionary file or the second dictionary file in accordance with the selection received by the operation device.

Hereinafter, an information processing apparatus and an information processing method according to an embodiment will be described with reference to the drawings. In the drawings, identical symbols denotes identical or similar parts. As an example in which the information processing apparatus and the information processing method of the embodiment are applied, a check-out system to be introduced into a store such as a supermarket will be described. As will be described later, the check-out system includes a POS terminal that performs registration and settlement of a commodity (or commodities) involved in one transaction. It should be noted that the information processing apparatus and the information processing method are not limited to the following embodiment.

FIG. 1 is a perspective view showing an example of a check-out system 1. As shown in FIG. 1, the check-out system 1 includes a commodity reading apparatus 101 that reads information about a commodity and a POS terminal 11 that performs registration and settlement of a commodity involved in one transaction. Hereinafter, an example in which the check-out system 1 including the POS terminal 11 and the commodity reading apparatus 101 is applied as the information processing apparatus according to this embodiment will be described.

The POS terminal 11 is disposed on an upper surface of a drawer 21 on the check-out table 41. An operation of opening the drawer 21 is controlled by the POS terminal 11. In an upper surface of the POS terminal 11, a keyboard 22 is arranged. The keyboard 22 is operated by an operator (e.g., employee of store). At a back side of the keyboard 22 as viewed from the operator who operates the keyboard 22, there is provided a display device 23 that displays information to the operator. The display device 23 displays information in a display surface 23a thereof. A touch panel 26 is stacked on the display surface 23a. Further, on a back side of the display device 23, a display device 24 for customers is provided upright to be rotatable. The display device 24 for customers displays information in a display surface 24a thereof. Note that the display device 24 for customers shown in FIG. 1 has the display surface 24a directed to the front in FIG. 1. The display device 24 for customers is rotatable such that the display surface 24a is directed to the back side in FIG. 1. Rotated to be directed to the back side in FIG. 1, the display device 24 displays information to customers.

Forming an L-shape with the check-out table 41 on which the POS terminal 11 is disposed, a counter table 151 having a laterally-long table shape is arranged. In an upper surface of the counter table 151, a commodity reception surface 152 is formed. A shopping basket 153 housing commodities G is placed on the commodity reception surface 152. The shopping basket 153 includes, for example, a first shopping basket 153a and a second shopping basket 153b. The first shopping basket 153a is carried in by a customer. The second shopping basket 153b is placed at a position opposite to the first shopping basket 153a while sandwiching the commodity reading apparatus 101 therebetween. Note that the shopping basket 153 is not limited to a so-called basket type and may be a tray or the like. Further, in particular, the second shopping basket 153b is not limited to a so-called basket type and may be a box type, bag type, or the like.

The commodity reading apparatus 101 is placed on the commodity reception surface 152 of the counter table 151. The commodity reading apparatus 101 is connected to be capable of transmitting and receiving data to/from the POS terminal 11. The commodity reading apparatus 101 includes a thin, rectangular housing 102. A reading window 103 is provided in a front face of the housing 102. An operation device 104 is mounted on an upper portion of the housing 102. The operation device 104 includes a display device 106. The display device 106 is a display unit having a surface on which a touch panel 105 is stacked. A keyboard 107 is provided on a right side of the display device 106. A card reading slit 108 of a card reader (not shown) is provided on a right side of the keyboard 107. On the back left of a rear surface of the operation device 104 as viewed from the operator, a display device 109 for customers for providing a customer with information is placed.

Figure 2:
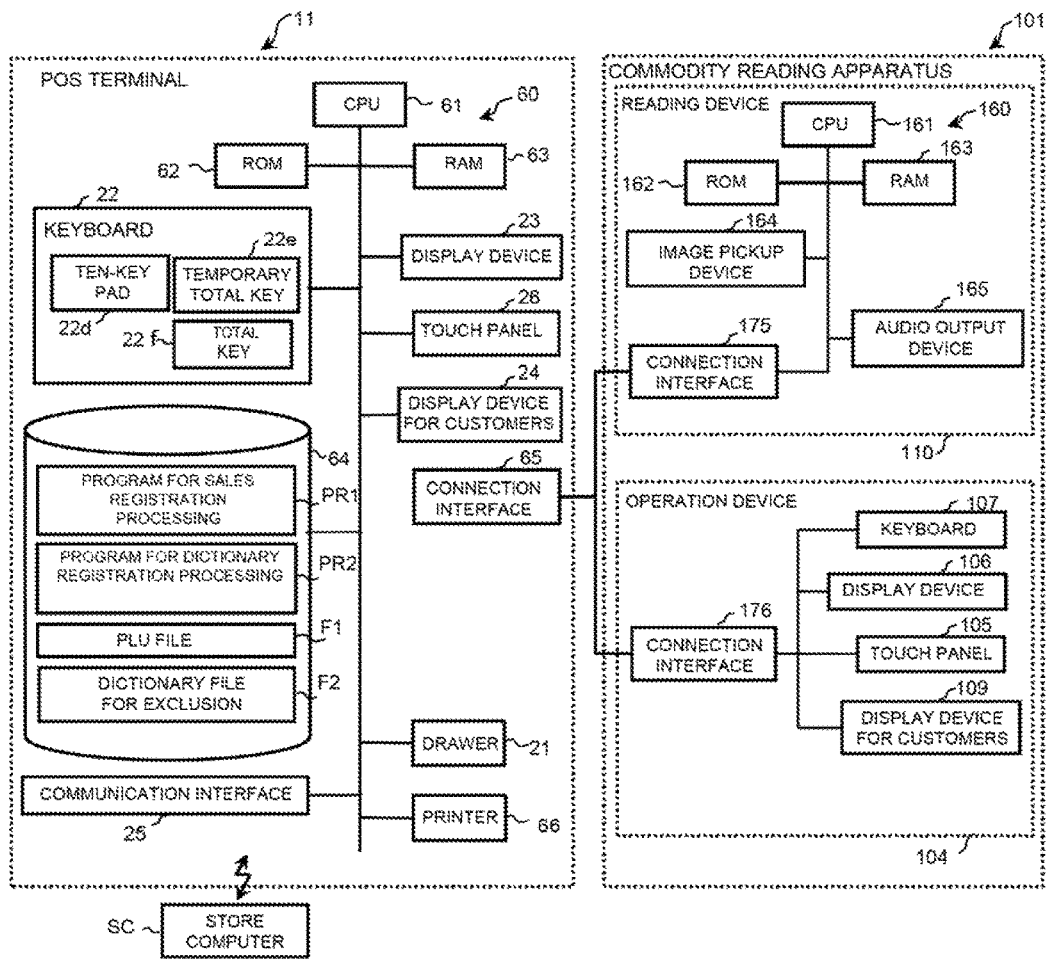
FIG. 2 is a block diagram showing hardware configurations of a POS terminal and a commodity reading apparatus according to the embodiment.

Further, the commodity reading apparatus 101 includes a reading device 110 (see FIG. 2). The reading device 110 includes an image pickup device 164 (see FIG. 2) arranged at the back of the reading window 103.

In the first shopping basket 153a carried in by the customer houses the commodities G involved in one transaction. The commodities G within the first shopping basket 153a are moved to the second shopping basket 153b by the operator who operates the commodity reading apparatus 101. In this movement process, each of the commodities G is made facing the reading window 103 of the commodity reading apparatus 101. At this time, the image pickup device 164 (see FIG. 2) arranged within the reading window 103 picks up an image of that commodity G.

The commodity reading apparatus 101 causes the operation device 104 to display a screen for allowing the operator to designate to which of commodities registered in a PLU file F1 (see FIG. 3) to be described later the commodity G included in the image picked up by the image pickup device 164 corresponds. Then, the commodity reading apparatus 101 notifies the POS terminal 11 about a commodity ID of the commodity designated by the operator. On the other hand, on the basis of the commodity ID notified from the commodity reading apparatus 101, the POS terminal 11 records information relating to sales registration, such as a commodity name and a unit price of the commodity corresponding to this commodity ID, in a sales master file (not shown), and performs sales registration.

FIG. 2 is a block diagram showing hardware configurations of the POS terminal 11 and the commodity reading apparatus 101. The POS terminal 11 includes a microcomputer 60. The microcomputer 60 is an information processing unit that executes information processing. The microcomputer 60 includes a processor 61, a read only memory (ROM) 62, and a random access memory (RAM) 63. The processor is, for example, a central processing unit (CPU) 61. Hereinafter, the processor 61 will be referred to as the CPU 61. The CPU 61 executes various types of arithmetic processing and controls respective units. The CPU 61 is connected to a read only memory (ROM) 62 and a random access memory (RAM) 63 via a bus.

In the CPU 61 of the POS terminal 11, the drawer 21, the keyboard 22, the display device 23, the touch panel 26, and the display device 24 for customers, which are described above, are connected via various input/output circuits (not shown). The drawer 21, the keyboard 22, the display device 23, the touch panel 26, and the display device 24 for customers are controlled by the CPU 61.

The keyboard 22 includes a ten-key pad 22d in which numerical values including "1", "2", "3", and the like and arithmetic operators of multiplication and the like are displayed in the upper surface, a temporary total key 22e, and a total key 22f.

A storage device 64 is connected to the CPU 61 of the POS terminal 11. The storage device 64 is, for example, a hard disk drive (HDD) 64. Hereinafter, the storage device 64 will be referred to as the HDD 64. The HDD 64 stores programs and various files. All or some of the programs and various files stored in the HDD 64 are deployed by the RAM 63 upon activation of the POS terminal 11, and executed by the CPU 61.

Examples of the programs stored in the HDD 64 are a program PR1 for sales registration processing and a program PR2 for dictionary registration processing. Examples of the files stored in the HDD 64 are the PLU file F1 and a dictionary file F2 for exclusion that are delivered from a store computer SC and stored.

Regarding each of the commodities G displayed and sold in the store, information relating to sales registration of the commodity G is registered in the PLU file F1. In the following description, the PLU file F1 is used as a dictionary (first dictionary file). Alternatively, the first dictionary file may be a file different from the PLU file F1. A feature amount of each of the commodities G to be recognition targets (hereinafter, referred to as reference commodities), which is extracted from a picked-up image of the reference commodity, is registered in the first dictionary file. If the first dictionary file is a file different from the PLU file F1, a feature amount relating to an identical reference commodity and information of the PLU file F1 are made corresponding to each other with a commodity ID or the like to be described later. Note that the feature amount is parameters indicating features of an outer appearance, such as a normal shape, colors, and patterns of the reference commodity and surface irregularities thereof.

Figure 3:
FIG. 3 is a conceptual diagram illustrating a data configuration of a PLU file according to the embodiment.

FIG. 3 is a conceptual diagram illustrating a data configuration of the PLU file F1. As shown in FIG. 3, commodity information of the commodity G and a feature amount of the commodity G are registered in association with each other in the PLU file F1. The commodity information includes information about the commodity G, such as a commodity ID, a commodity category, a commodity name, a unit price, and an illustration image. The commodity ID is identification information uniquely allocated to each commodity G that is the reference commodity. The commodity category is a category to which the commodity G belongs. The commodity name is a name of the commodity G. The unit price is a price of the commodity G. The illustration image is an image showing the commodity G. The PLU file F1 can be read out by the commodity reading apparatus 101 via a connection interface 65 to be described later.

Note that, if it is necessary to recognize (detect) the kind of the object, information about a commodity, such as a commodity name and a unit price, an illustration image showing that commodity, and a feature amount thereof are made corresponding to one another for each kind and managed in the PLU file F1. In a case of displaying a candidate to be described later with literal characters instead of displaying the candidate with an illustration image, the illustration image does not need to be registered in the PLU file F1. Note that registration items included in the PLU file F1 are not limited to the example of FIG. 3.

The dictionary file F2 for exclusion is an example of the second dictionary file. Regarding each of objects to be excluded from the recognition targets (hereinafter, referred to as exclusion objects), a feature amount of this exclusion object is registered in the dictionary file F2 for exclusion. The dictionary file F2 for exclusion is used as a dictionary as in the case of the PLU file F1.

Feature amounts of universal exclusion objects are registered in the dictionary file F2 for exclusion in advance. For example, in the check-out system 1 shown in FIG. 1, the reading window 103 is arranged to be directed to the operator. Therefore, there is a possibility that images of objects other than the commodities G, such as parts (hand and arm) of the operator's body, may be picked up by the image pickup device 164. In view of this, the hand and arm whose images can be picked up by the image pickup device 164 are considered as the universal exclusion objects and feature amounts thereof are registered in the dictionary file F2 for exclusion. With this, it is possible to reduce occurrence of erroneous recognition where, if an image of the operator's hand is picked up by the image pickup device 164, the hand is recognized as the commodity G (reference commodity).

FIG. 4 is a conceptual diagram illustrating a data configuration of the dictionary file F2 for exclusion. As shown in FIG. 4, the dictionary file F2 for exclusion stores, for each exclusion object, an object ID that is uniquely allocated identification information, an object name, and a feature amount of colors, surface irregularities, or the like, which are read from a picked-up image of that exclusion object in association with one another. Note that FIG. 4 shows an example in which information about a hand of a person is stored as the exclusion object, though the exclusion object is not limited thereto. The dictionary file F2 for exclusion can be read out by the commodity reading apparatus 101 via the connection interface 65 to be described later. Note that registration items included in the dictionary file F2 for exclusion are not limited to the example of FIG. 4.

Referring back to FIG. 2, a communication interface 25 is connected to the CPU 61 of the POS terminal 11 via an input/output circuit (not shown). The communication interface 25 is for executing data communication with the store computer SC. The store computer SC is placed in the backyard or the like of the store. In an HDD (not shown) of the store computer SC, the PLU file F1 and the dictionary file F2 for exclusion, which are to be delivered to the POS terminal 11, are stored.

In addition, the connection interface 65 is connected to the CPU 61 of the POS terminal 11. The connection interface 65 enables data to be exchanged with the commodity reading apparatus 101. The commodity reading apparatus 101 is connected to the connection interface 65. Further, a printer 66 is connected to the CPU 61 of the POS terminal 11. The printer 66 performs printing on a receipt or the like. The printer 66 prints the transaction contents of one transaction on a receipt under the control of the CPU 61.

The commodity reading apparatus 101 also includes a microcomputer 160. The microcomputer 160 includes a processor 161, a ROM 162, and a RAM 163. The processor 161 is, for example, a CPU. Hereinafter, the processor 161 will be referred to as a CPU 161. The ROM 162 and the RAM 163 is connected to the CPU 161 via the bus. Programs to be executed by the CPU 161 is stored in the ROM 162. The image pickup device 164 and an audio output device 165 are connected to the CPU 161 via various input/output circuits (not shown). The operation device 104 is connected to the reading device 110 and the POS terminal 11 via a connection interface 176. The connection interface 176 is connected to the touch panel 105, the display device 106, the keyboard 107, and the display device 109 for customers in the operation device 104. Operations of the operation device 104 are controlled by the CPU 161 of the reading device 110 and the CPU 61 of the POS terminal 11.

The image pickup device 164 is an image pickup means that successively picks up images of the object within the image pickup range and outputs the picked-up images in series under the control of the CPU 161 in order to recognize the commodity. Note that the image pickup range corresponds to a reading region of the image pickup device 164, which is defined by the reading window 103. The image pickup device 164 is, for example, a color CCD image sensor or a color CMOS image sensor. The image pickup device 164 picks up moving images at 30 fps, for example. Frame images (picked-up images) sequentially picked up by the image pickup device 164 at a predetermined frame rate are saved in the RAM 163.

The audio output device 165 includes an audio circuit, a speaker, and the like for producing warning sounds or the like set in advance. The audio output device 165 performs informing with warning sounds or voices under the control of the CPU 161.

In addition, a connection interface 175 is connected to the CPU 161. The connection interface 175 is connected to the connection interface 65 of the POS terminal 11. The CPU 161 exchanges data with the POS terminal 11 via the connection interface 175 and the connection interface 65. Further, the CPU 161 performs exchanges data with the operation device 104 via the connection interface 175.

Next, functional configurations of the CPU 161 and the CPU 61, which are realized by the CPU 61 and the CPU 161 executing the program, will be described with reference to FIG. 5.

Figure 5:
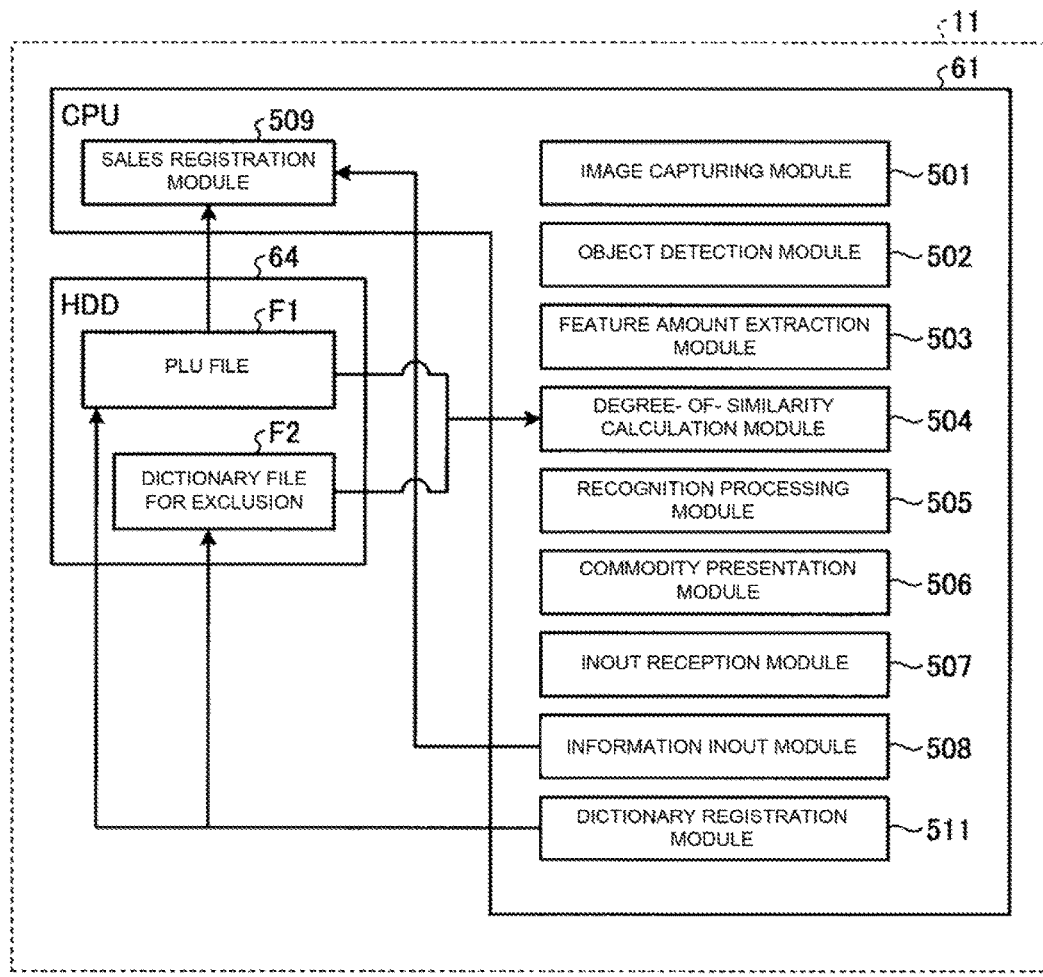
FIG. 5 is a block diagram showing a functional configuration of the POS terminal according to the embodiment.

FIG. 5 is a block diagram showing a functional configuration of the POS terminal 11. First of all, a functional configuration relating to sales registration processing will be described. As shown in FIG. 5, the CPU 61 of the POS terminal 11 operates in accordance with a program PR1 for sales registration processing, to thereby function as an image capturing module 501, an object detection module 502, a feature amount extraction module 503, a degree-of-similarity calculation module 504, a recognition processing module 505, a commodity presentation module 506, an input reception module 507, an information input module 508, and a sales registration module 509.

The image capturing module 501 outputs an image pickup ON signal to the image pickup device 164 for causing the image pickup device 164 to start an image pickup operation. After the start of the image pickup operation, the image pickup device 164 picks up images and saves the picked-up images in the RAM 163. The image capturing module 501 sequentially captures those picked-up images (frame images). Specifically, the image capturing module 501 captures the picked-up images in the order that they were saved in the RAM 163.

Figure 6:
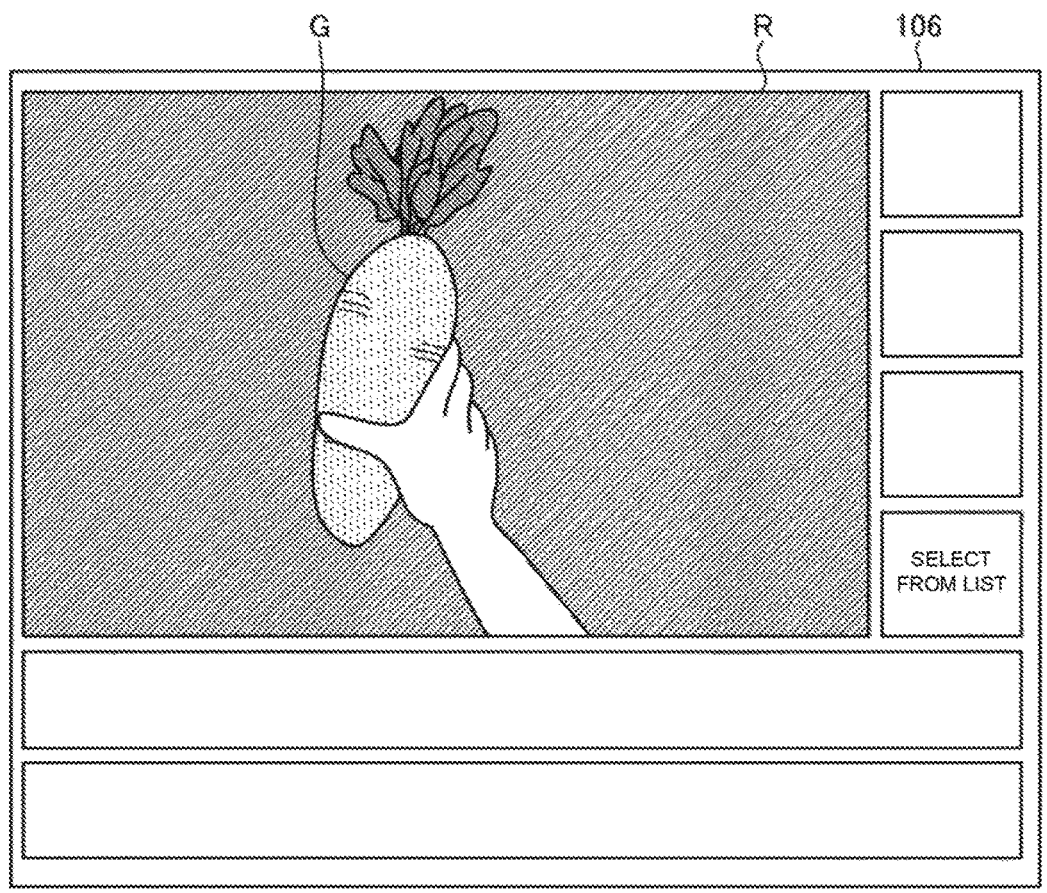
FIG. 6 is a diagram showing an example of a picked-up image according to the embodiment.

FIG. 6 is a diagram showing an example of a picked-up image captured by the image capturing module 501. As shown in FIG. 6, when the operator brings the commodity G in front of the reading window 103, the entire commodity G or a part of the commodity G enters a display region R of the display device 106. The display region R of the display device 106 corresponds to the reading region of the image pickup device 164. Hereinafter, the display region R will be referred to as a reading region R. Then, the picked-up image of the commodity G, which is obtained by the image pickup device 164, is displayed by the display device 106 of the commodity reading apparatus 101.

The object detection module 502 detects the entire object or a part of the object included in the picked-up image captured by the image capturing module 501, by using a pattern matching technique or the like. Specifically, the object detection module 502 extracts, from an image obtained by binarizing the captured picked-up image, an outline or the like of the object. Next, the object detection module 502 compares the outline extracted from the previous picked-up image with the outline extracted from the current picked-up image, to thereby detect the object such as the commodity G made facing the reading window 103 for sales registration.

The feature amount extraction module 503 extracts, from the picked-up image from which the object detection module 502 has detected the object, a feature amount of this object. Specifically, the feature amount extraction module 503 extracts, from a region (inclusion region) of the object included in the picked-up image, colors of this object and a surface state such as surface irregularities, as the feature amount.

The degree-of-similarity calculation module 504 compares the feature amount that the feature amount extraction module 503 has extracted from the picked-up image with each of the feature amounts registered in the PLU file F1 and the dictionary file F2 for exclusion, and calculates each of degrees of similarity thereof. Here, the degree of similarity quantitatively expresses how much degree the feature amount extracted from the picked-up image and each of the feature amounts registered in the PLU file F1 and the dictionary file F2 for exclusion are similar to each other. For example, if the feature amount extracted from the picked-up image is completely identical to the feature amount of a certain reference commodity, the degree of similarity is 100% (1.0).

Note that, for example, weighting may be varied between the colors and the surface irregularities and the degree of similarity may be calculated. Further, a method of calculating the degree of similarity is not particularly limited. For example, the degree of similarity may be calculated in absolute evaluation or may be calculated in relative evaluation. In the case of calculating the degree of similarity in the absolute evaluation, it is only necessary to compare the feature amount extracted from the picked-up image with each of the feature amounts registered in the PLU file F1 and the dictionary file F2 for exclusion in a one-to-one manner and to employ a degree of similarity derived as the comparison result as it is. On the other hand, in the case of calculating the degree of similarity in the relative evaluation, it is only necessary to calculate the degree of similarity such that a sum of degrees of similarity between the feature amount extracted from the picked-up image and the respective feature amounts registered in the PLU file F1 and the dictionary file F2 for exclusion is 1.0 (100%).

On the basis of the degree of similarity calculated by the degree-of-similarity calculation module 504, the recognition processing module 505 recognizes a reference commodity whose degree of similarity to the object included in the picked-up image is equal to or larger than a predetermined threshold, as a candidate of this object. Specifically, the recognition processing module 505 determines whether or not the degree of similarity between the object included in the picked-up image and the exclusion object is dominant.

Here, a method of determining whether or not the degree of similarity to the exclusion object is dominant is not particularly limited and various methods can be employed. For example, if a maximum value of the degree of similarity to the exclusion object is above the predetermined threshold (50%, 80%, or the like), the recognition processing module 505 determines that the degree of similarity to the exclusion object is dominant. Alternatively, if the maximum value of the degree of similarity to the exclusion object is above a maximum value of the degree of similarity to the reference commodity, the recognition processing module 505 determines that the degree of similarity to the exclusion object is dominant.

If the degree of similarity between the object included in the picked-up image and the exclusion object is dominant, the recognition processing module 505 cancels processing of recognizing a candidate of this object from the reference commodity. With this, for example, if an image of the operator's hand is picked up, the degree of similarity to the exclusion object (hand) is dominant. Thus, it is possible to prevent the hand from being erroneously recognized as the reference commodity. Further, for example, also if the hand holding the commodity G covers a large part of this commodity G, the degree of similarity to the exclusion object (hand) is dominant. Thus, erroneous recognition of the commodity G can be prevented.

On the other hand, if the degree of similarity to the exclusion object is not dominant, the recognition processing module 505 recognizes (selects) a reference commodity whose degree of similarity is above the predetermined threshold as a candidate of the object included in the picked-up image, on the basis of a degree of similarity calculated for each of the reference commodities.

Recognizing an object included in an image in this manner is called generic object recognition. Regarding the generic object recognition, various recognition techniques are explained in document below. Keiji Yanai, "The Current State and Future Directions on Generic Object Recognition", Journal of Information Processing Society of Japan, Vol. 48, No. SIG16 [searched on Aug. 30, 2016], the Internet <URL: http://mm.cs.uec.ac.jp/IPSJ-TCVIM-Yanai.pdf>

In addition, a technique of performing generic object recognition by dividing an image into regions for each object is explained in document below.

Jamie Shotton, et al., "Semantic Texton Forests for Image Categorization and Segmentation", [searched on Aug. 30, 2016], the Internet <URL: http://citeseerx.ist.psu.edu/view-doc/download?doi=10.1.1.145.3036&rep=rep1&type=pdf>

Note that, in this embodiment, regarding the degree of similarity to the reference commodity, a plurality of conditions are stepwisely provided and the recognition processing module 505 confirms the object included in the picked-up image or selects a candidate in accordance with a satisfied condition.

For example, the recognition processing module 505 determines whether or not there is a reference commodity whose degree of similarity is equal to or larger than a first threshold (e.g., 90%). If there is one reference commodity satisfying this condition, the recognition processing module 505 recognizes (confirms) this reference commodity as the object included in the picked-up image (as confirmed commodity). Further, if there are a plurality of reference commodities whose degrees of similarity are equal to or larger than the first threshold, the recognition processing module 505 recognizes each of these reference commodities as a candidate of the object included in the picked-up image (as commodity candidate). Note that the recognition processing module 505 may count the number of times when the degree of similarity is equal to or larger than the first threshold with respect to successively picked-up images in series, and may determine that a condition relating to the first threshold is satisfied if this number of times is equal to or larger than a predetermined number of times.

Further, the recognition processing module 505 determines whether or not there is a reference commodity whose degree of similarity is smaller than the first threshold and equal to or larger than a second threshold (first threshold>second threshold, for example, 50%). If there are reference commodities satisfying this condition, the recognition processing module 505 recognizes each of these reference commodities as a candidate of the object included in the picked-up image (as commodity candidate). Note that the recognition processing module 505 may count the number of times when the degree of similarity is smaller than the first threshold and equal to or larger than the second threshold with respect to successively picked-up images in series, and may determine that a condition relating to the second threshold is satisfied if this number of times is equal to or larger than a predetermined number of times.

Note that the threshold and the number of counts can be appropriately set and not limited to the above-mentioned examples. Further, the number of counts may be set to be different for each condition.

The commodity presentation module 506 informs the operator and the customer of the recognition result of the recognition processing module 505 through image output, audio output, and the like. Specifically, if a single reference commodity is uniquely confirmed as the object included in the picked-up image, the commodity presentation module 506 causes the display device 106 to display a confirmation screen A1 (see FIG. 7) indicating the fact.

Figure 7:
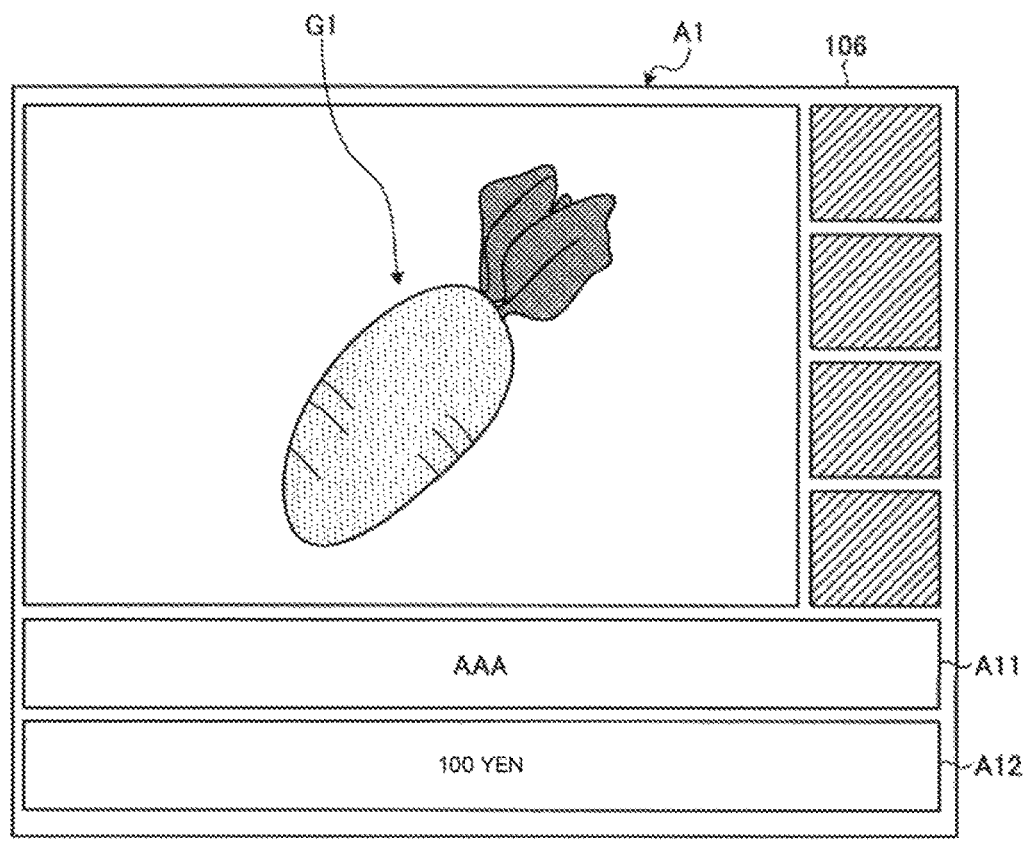
FIG. 7 is a diagram showing an example of a confirmation screen according to the embodiment.

FIG. 7 is a diagram showing an example of the confirmation screen A1. If one reference commodity is uniquely confirmed as the object included in the picked-up image, the commodity presentation module 506 stops display of the picked-up image of the reading region R (see FIG. 6). The commodity presentation module 506 reads out an illustration image G1 and a commodity name (AAA) corresponding to the confirmed reference commodity from the PLU file F1, and displays them on the confirmation screen A1. Further, the commodity presentation module 506 displays the commodity name of the reference commodity, which is read out from the PLU file F1, and a commodity price (unit price) in a commodity name display region A11 and a price display region A12, respectively.

Further, if one or more of reference commodities are recognized as candidates of the object included in the picked-up image, the commodity presentation module 506 causes the display device 106 to display information about these reference commodities as commodity candidates. Specifically, the commodity presentation module 506 reads out illustration images and commodity names of the reference commodities recognized as the candidates from the PLU file F1, and displays them on a commodity candidate selection screen A2 (see FIG. 8) in order from that whose degree of similarity calculated by the degree-of-similarity calculation module 504 is higher.

Figure 8:
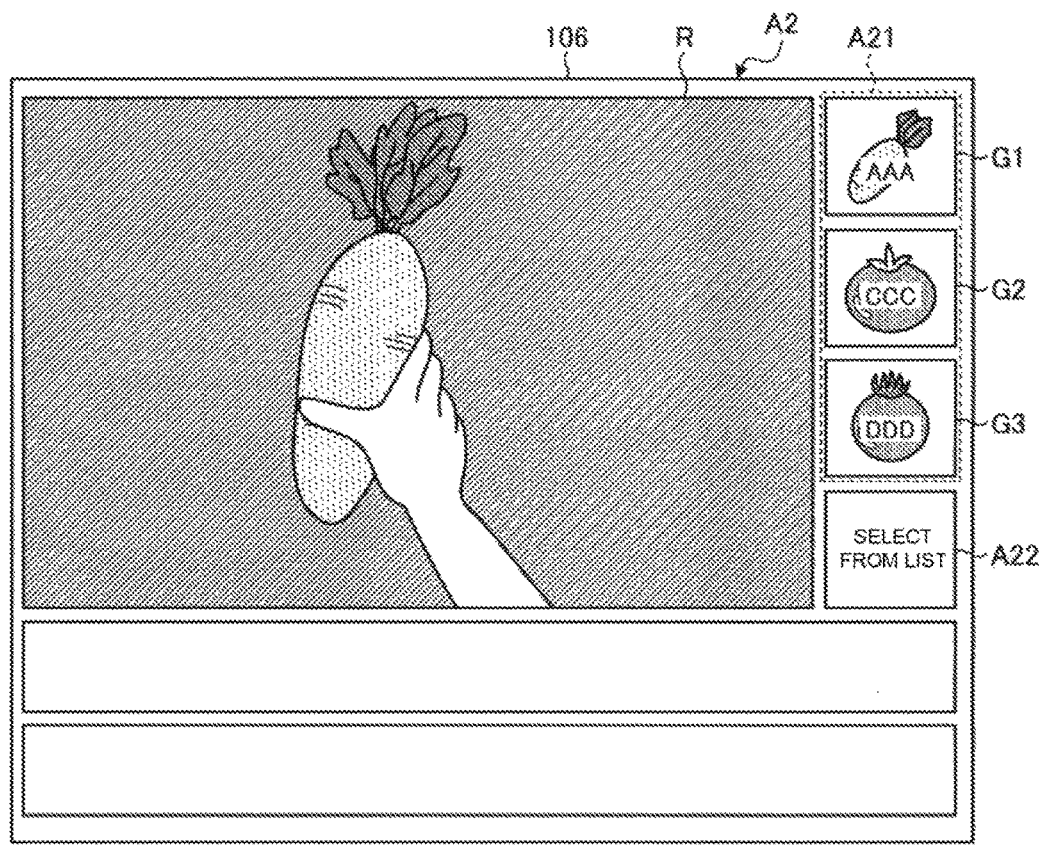
FIG. 8 is a diagram showing an example of a commodity candidate selection screen according to the embodiment.

FIG. 8 is a diagram showing an example of the commodity candidate selection screen A2. As shown in FIG. 8, in a commodity candidate presentation region A21 of the commodity candidate selection screen A2, the illustration images G1, G2, G3 of these commodity candidates and the commodity names are displayed in order from the candidate whose degree of similarity is higher. These illustration images G1, G2, G3 can be selected in accordance with a selection operation on the touch panel 105. Further, a selection button A22 for selecting a commodity from a commodity list is provided below the commodity candidate presentation region A21. The commodity selected from the commodity list is processed as the above-mentioned confirmed commodity. Note that, although FIG. 8 shows the example in which three candidates corresponding to the illustration images G1 to G3 are displayed, the number of candidates and the display method are not limited thereto.

Note that, even in a state which the illustration images G1 to G3 of the commodity candidates are displayed by the display device 106, if no selection operations with respect to these commodity candidates are received, the image capturing processing by the image capturing module 501, the detection processing by the object detection module 502, the feature amount extraction processing by the feature amount extraction module 503, the degree-of-similarity calculation processing by the degree-of-similarity calculation module 504, and the recognition processing by the recognition processing module 505 are continued. Thus, while the commodity candidates are not selected, the picked-up image is displayed in the reading region R of the commodity candidate selection screen A2 as shown in FIG. 8.

The input reception module 507 receives various input operations corresponding to display of the display device 106 via the touch panel 105 or the keyboard 107. For example, the input reception module 507 receives a selection operation with respect to any one of the illustration images from the illustration images G1 to G3 (see FIG. 8) of the commodity candidates displayed by the display device 106. The input reception module 507 receives the reference commodity of the selected illustration image as being the confirmed commodity corresponding to the commodity G whose image is picked up by the image pickup device 164. Note that when the input reception module 507 receives the selection operation, the commodity presentation module 506 causes the display device 106 to display the confirmation screen A1 on which the received commodity candidate is displayed as the confirmed commodity.

Regarding the commodity confirmed in the above-mentioned manner (confirmed commodity), the information input module 508 inputs information (e.g., commodity ID and commodity name) indicating that confirmed commodity via the connection interface 175. Note that the information input module 508 may input the number of sales additionally input via the touch panel 105 or the keyboard 107 together with the commodity ID and the like.

On the basis of the commodity ID and the number of sales input from the information input module 508, the sales registration module 509 performs sales registration of the corresponding commodity. Specifically, the sales registration module 509 performs sales registration by referring to the PLU file F1 and recording the notified commodity ID and the commodity category, commodity name, unit price, and the like corresponding to this commodity ID together with the number of sales on a sales master file or the like.

Next, a functional configuration relating to registration of information about the reference commodity and the exclusion object in the PLU file F1 and the dictionary file F2 for exclusion (hereinafter, referred to as dictionary registration) will be described. As described above, on the basis of the degree of similarity between the feature amount of the object (commodity G) whose image is picked up by the image pickup device 164 and the feature amount of each of the reference commodities registered in the PLU file F1, the POS terminal 11 executes processing for recognizing that object. Further, by using the dictionary file F2 for exclusion, the POS terminal 11 cancels the recognition processing of the object if the degree of similarity to the exclusion object is dominant.

By the way, if a use environment such as a place where and a season when the check-out system 1 is used changes, objects to be recognition targets and the reference commodities and the exclusion objects can also change. For example, information about new varieties of fruits and vegetables and commodities locally produced in particular regions are not registered in the PLU file F1 in an initial state. Therefore, for setting them as the recognition targets, it is necessary to register feature amounts of those objects in the PLU file F1. Further, for example, if a design of uniforms worn by employees of the store is set as the exclusion object, uniforms are generally different in each of that store and an affiliated store, and hence are not registered in the PLU file F1 in the initial state. Therefore, for setting the design of the uniforms as the exclusion object, it is necessary to register a feature amount of a design depending on uniforms adopted in each of that store and the affiliated store, in the dictionary file F2 for exclusion.

In view of this, the POS terminal 11 supports the dictionary registration in the PLU file F1 and the dictionary file F2 for exclusion. Specifically, the CPU 61 of the POS terminal 11 operates in accordance with the program PR2 for dictionary registration processing, to thereby function as a dictionary registration module 511 that supports the dictionary registration.

The dictionary registration module 511 cooperates with the image capturing module 501, the object detection module 502, the feature amount extraction module 503, and the like, to thereby execute registration processing for additionally registering a feature amount of the reference commodity or the exclusion object in the PLU file F1 or the dictionary file F2 for exclusion. Specifically, when the dictionary registration module 511 receives an instruction of the dictionary registration via the operation device 104, the keyboard 107, and the like, the dictionary registration module 511 causes the display device 106 to display an object attribute selection screen A3 (see FIG. 9) for allowing selection of an attribute of an object that is a registration target.

Figure 9:
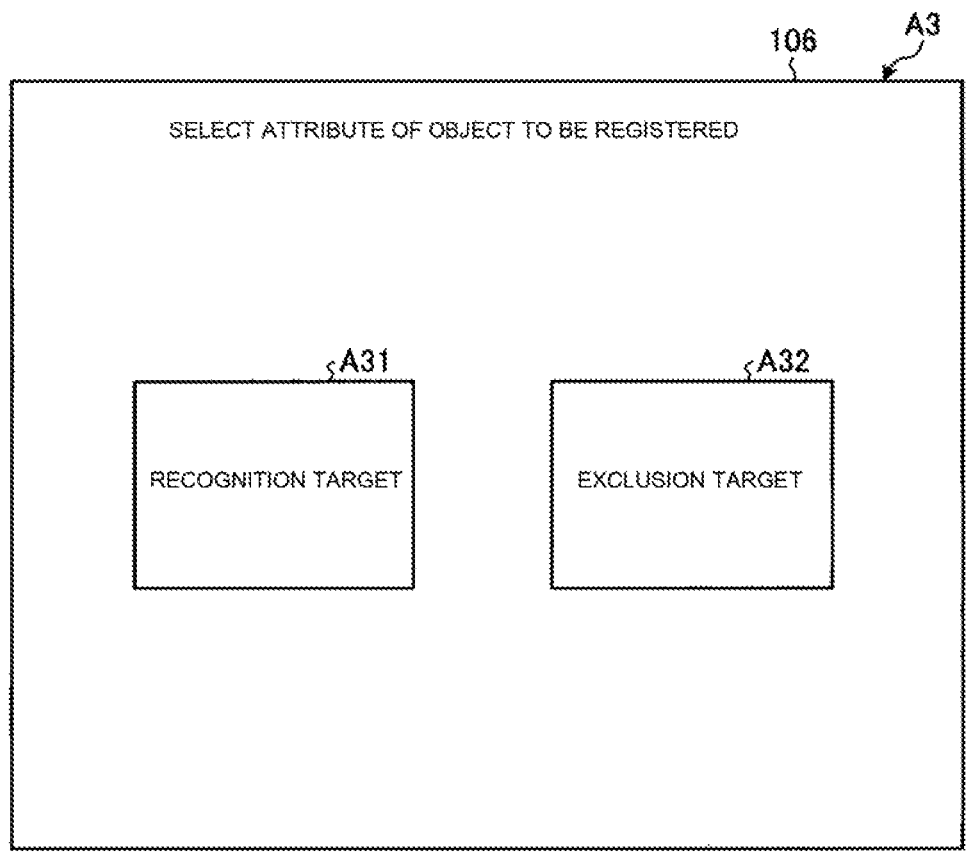
FIG. 9 is a diagram showing an example of an object attribute selection screen according to the embodiment.

FIG. 9 is a diagram showing an example of the object attribute selection screen A3. The object attribute selection screen A3 is a screen for receiving selection as to whether to register the feature amount of the reference commodity in the first dictionary file or register the feature amount of the exclusion object in the second dictionary file. Specifically, as shown in FIG. 9, the object attribute selection screen A3 includes operation elements (selection button A31, selection button A32) for selecting a recognition target or an exclusion target, as the attribute of the object to be registered. Here, the selection button A31 is an operation element for selecting the recognition target. Further, the selection button A32 is an operation element for selecting the exclusion target. When the dictionary registration module 511 receives an operation on the selection button A31, the dictionary registration module 511 determines that an instruction to register the object of the recognition target (reference commodity) is made. Otherwise, when the dictionary registration module 511 receives an operation on the selection button A32, the dictionary registration module 511 determines that an instruction to register the object of the exclusion target (exclusion object) is made.

Using the fact that the instruction to register the reference commodity is made as a condition, the dictionary registration module 511 causes the display device 106 to display a reference commodity input screen A4 (see FIG. 10) for inputting information about the reference commodity to be newly registered.

Figure 10:
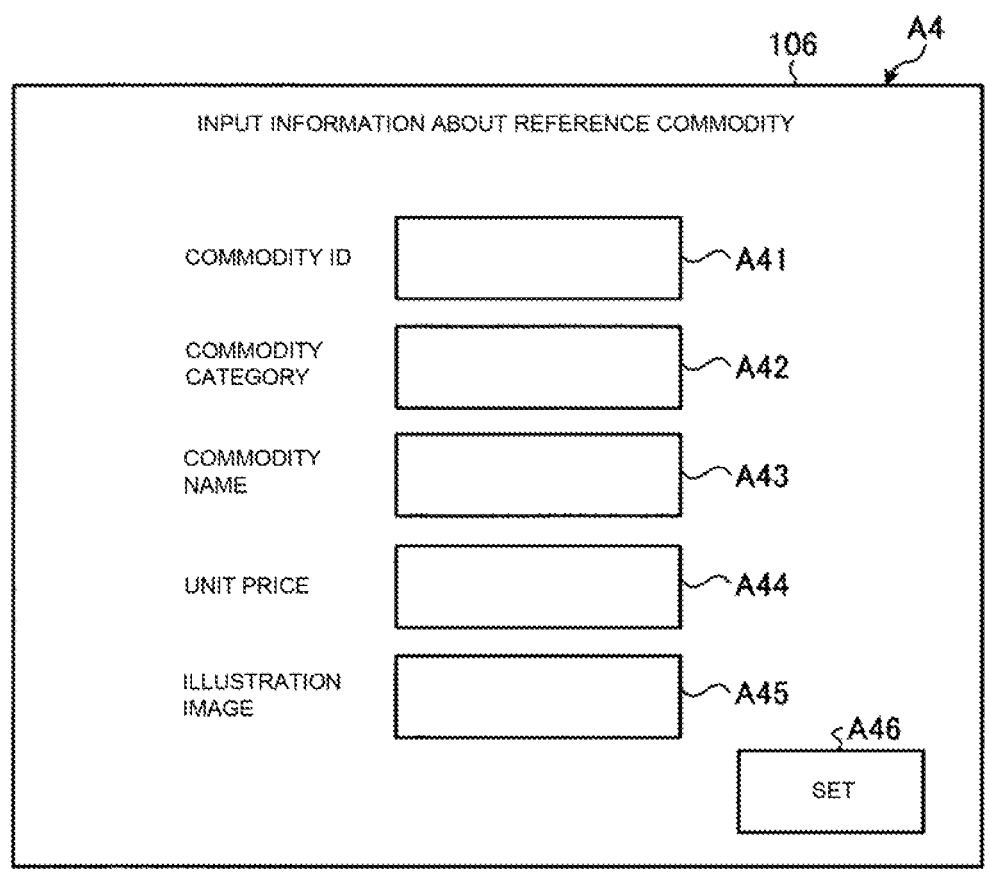
FIG. 10 is a diagram showing an example of a reference commodity input screen according to the embodiment.

FIG. 10 is a diagram showing an example of the reference commodity input screen A4. As shown in FIG. 10, the reference commodity input screen A4 includes input items A41 to A45 for inputting commodity information such as a commodity ID, a commodity category, a commodity name, a unit price, and an illustration image. Here, a path or the like indicating the storage source of the illustration image is input into the input item A45.

When the dictionary registration module 511 receives an operation on a "Set" button A46 provided in the reference commodity input screen A4 after commodity information is input in the input items A41 to A45, the dictionary registration module 511 saves the input commodity information in the RAM 63 or the like. Next, the dictionary registration module 511 cooperates with the image capturing module 501, to thereby causes the image pickup device 164 to start the image pickup operation and start image pickup of the reference commodity (commodity G) to be newly registered. Further, the dictionary registration module 511 cooperates with the object detection module 502 and the feature amount extraction module 503, to thereby extract a feature amount from an inclusion region of the reference commodity included in the picked-up image. Then, the dictionary registration module 511 registers the previously saved commodity information and the extracted feature amount as registration information in the PLU file F1 (dictionary registration).

Otherwise, by using the instruction to register the exclusion object as a condition, the dictionary registration module 511 causes the display device 106 to display an exclusion object input screen A5 (see FIG. 11) for inputting information about the exclusion object to be newly registered.

Figure 11:
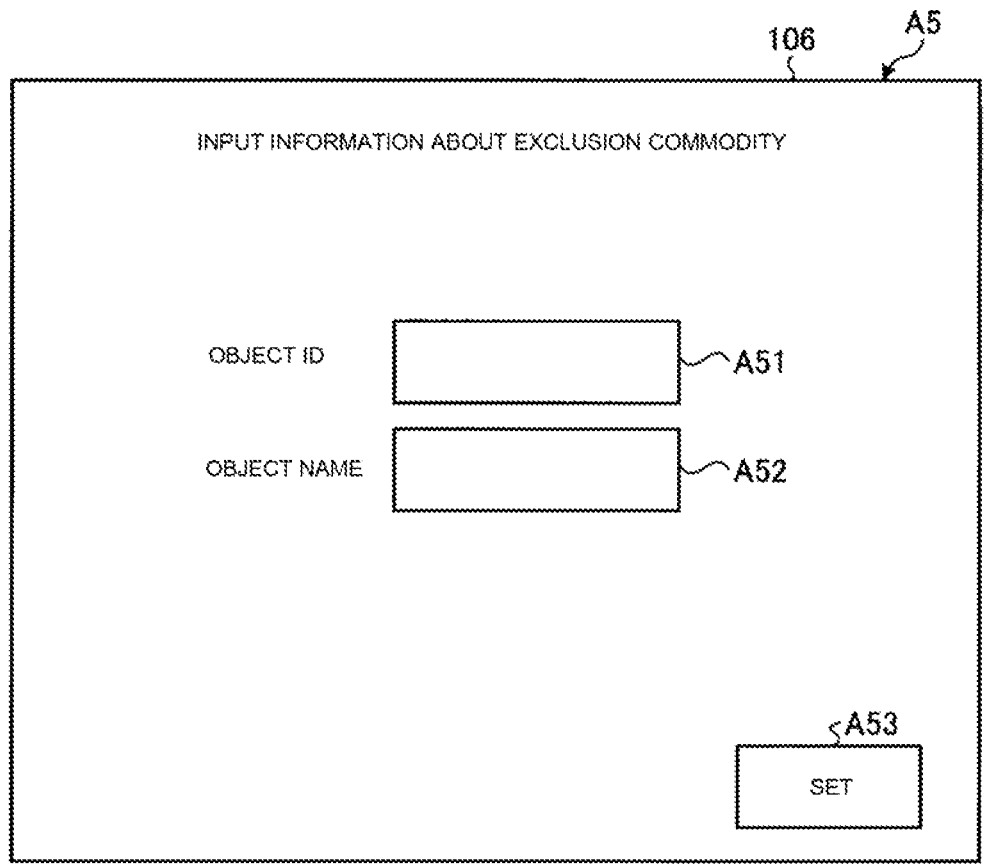
FIG. 11 is a diagram showing an example of an exclusion object input screen according to the embodiment.

FIG. 11 is a diagram showing an example of the exclusion object input screen A5. As shown in FIG. 11, the exclusion object input screen A5 includes input items A51, A52 for inputting an exclusion object information such as an object ID and an object name.

When the dictionary registration module 511 receives an operation on a "Set" button A53 provided in the exclusion object input screen A5 after the input items A51, A52 are input, the dictionary registration module 511 saves the input commodity information and the illustration image in the RAM 63 or the like. Next, the dictionary registration module 511 cooperates with the image capturing module 501, to thereby cause the image pickup device 164 to start the image pickup operation and start image pickup of the exclusion object to be newly registered (e.g., design of uniforms). Further, the dictionary registration module 511 cooperates with the object detection module 502 and the feature amount extraction module 503, to thereby extract a feature amount from an inclusion region of the exclusion object included in the picked-up image. Then, the dictionary registration module 511 registers the previously saved exclusion object information and the extracted feature amount as the registration information in the dictionary file F2 for exclusion (dictionary registration).

Note that, although the number of extracted feature amount is not particularly limited, a plurality of feature amounts are favorably extracted. Specifically, the dictionary registration module 511 extracts a predetermined number of feature amounts from a plurality of picked-up images in series which are obtained by successively performing image pickup on one object (reference commodity, exclusion object), and registers these feature amounts. Thus, for each of the picked-up images from which the object is detected by the object detection module 502, a feature amount of this object is extracted by the feature amount extraction module 503. Note that the number of extracted feature amounts may be designated via the keyboard 22, the keyboard 107, or the like.

In addition, in order to share the newly registered registration information with other POS terminals 11 and the like, the dictionary registration module 511 sends this registration information to the store computer SC together with category information indicating the file in which the registration information is registered. When the store computer SC receives the registration information and the category information from the POS terminal 11, the store computer SC determines to which of the PLU file F1 and the dictionary file F2 for exclusion this category information corresponds. After the registration information is registered in the corresponding file to thereby update this file, the store computer SC delivers the updated file to each of the POS terminals 11. Note that the timing at which the registration information is sent to the store computer SC and the timing at which the updated file is delivered to the POS terminal 11 are not particularly limited. For example, the registration information and the updated file may be sent (delivered) immediately after update or may be sent (delivered) at a predetermined time.

When the dictionary registration module 511 receives the instruction of the dictionary registration in this manner, the dictionary registration module 511 causes the display device 106 to display the above-mentioned object attribute selection screen A3, reference commodity input screen A4, and exclusion object input screen A5, to thereby support dictionary registration of a new object.

Figure 12:
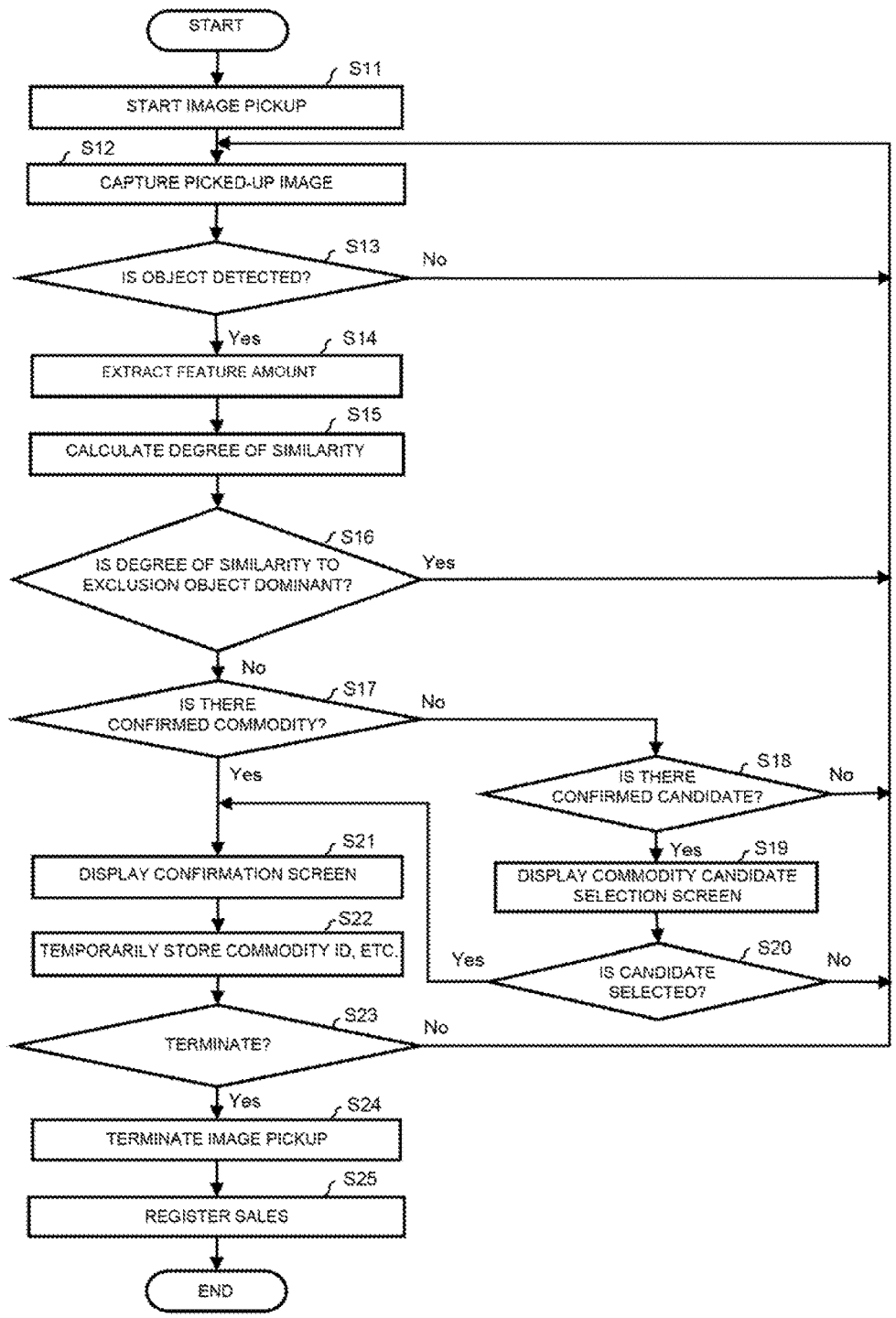
FIG. 12 is a flowchart showing an example of sales registration processing executed by the POS terminal of the embodiment.

Hereinafter, an operation of the POS terminal 11 will be described. First of all, sales registration processing executed by the POS terminal 11 will be described with reference to FIG. 12. Here, FIG. 12 is a flowchart showing an example of the sales registration processing executed by the POS terminal 11. The CPU 61 of the POS terminal 11 operates in accordance with the program PR1 for sales registration processing, to thereby execute the sales registration processing.

First of all, in Step S11, the CPU 61 (image capturing module 501) outputs the image pickup ON signal to the image pickup device 164, to thereby cause the image pickup device 164 to start the image pickup operation. The CPU 61 saves an image (picked-up image) picked up by the image pickup device 164 in the RAM 163. Further, in Step S12, the CPU 61 (image capturing module 501) captures the image (picked-up image) picked up by the image pickup device 164 and saved in the RAM 163.

Subsequently, in Step S13, the CPU 61 (object detection module 502) detects a region in which the object is included, from the captured picked-up image (see Step S12). In Step S13, if the object is not detected (No in Step S13), the processing of the CPU 61 returns to Step S12. In Step S13, if the object is detected (Yes in Step S13), the processing of the CPU 61 shifts to Step S14. In Step S14, the CPU 61 (feature amount extraction module 503) extracts, from a region of the picked-up image in which that object is detected, a feature amount of this object.

Subsequently, in Step S15, the CPU 61 (degree-of-similarity calculation module 504) compares the extracted feature amount of the object (see Step S14) with each of the feature amounts registered in the PLU file F1 and the dictionary file F2 for exclusion. On the basis of the comparison result, the CPU 61 calculates a degree of similarity between the extracted feature amount of the object and each of the registered feature amounts.

Subsequently, in Step S16, on the basis of the calculated degree of similarity (see Step S15), the CPU 61 (recognition processing module 505) determines whether or not the degree of similarity between the object included in the picked-up image and the exclusion object is dominant. For example, the CPU 61 (recognition processing module 505) determines whether or not the degree of similarity to the exclusion object is dominant on the basis of a maximum value of the degree of similarity calculated for the exclusion object or on the basis of a comparison result or the like between this maximum value and a maximum value of the degree of similarity calculated for the reference commodity.

In Step S16, if it is determined that the degree of similarity between the object included in the picked-up image and the exclusion object is dominant (Yes in Step S16), the processing of the CPU 61 returns to Step S12. Further, if it is determined that the degree of similarity between the object included in the picked-up image and the exclusion object is not dominant (No in Step S16), the CPU 61 (recognition processing module 505) executes object recognition processing on the object included in the picked-up image on the basis of the degree of similarity calculated for the reference commodity.

Subsequently, in Step S17, the CPU 61 (recognition processing module 505) determines whether or not there is a confirmed commodity. For example, if there is one reference commodity whose calculated degree of similarity is equal to or larger than the first threshold (e.g., 90%), the CPU 61 (recognition processing module 505) determines that reference commodity as the confirmed commodity.

If there is a confirmed commodity (Yes in Step S17), the processing of the CPU 61 shifts to Step S21. In Step S21, the CPU 61 (commodity presentation module 506) causes the display device 106 to display the confirmation screen A1 including an illustration image of the confirmed commodity. Further, in Step S22, the CPU 61 (information input module 508) temporarily saves a commodity ID and the like of the reference commodity determined as the confirmed commodity in a temporary storage file such as the RAM 63 together with the number of sales additionally input via the keyboard 107. Next, the processing of the CPU 61 shifts to Step S23.

Further, if there are no confirmed commodities (No in Step S17), the processing of the CPU 61 shifts to Step S18. In Step S18, the CPU 61 (recognition processing module 505) determines whether or not there is a commodity candidate. For example, if there are a plurality of reference commodities whose calculated degrees of similarity are equal to or larger than the first threshold (e.g., 90%) and equal to or larger than the second threshold (e.g., 50%), the CPU (recognition processing module 505) determines those reference commodities as commodity candidates.

If there is a commodity candidate (Yes in Step S18), the processing of the CPU 61 shifts to Step S19. In Step S19, the CPU 61 (commodity presentation module 506) sorts illustration images and commodity names of the respective commodity candidates in order from that whose degree of similarity is higher, and causes the display device 106 to display them in the commodity candidate presentation region A21 (see FIG. 8).

Subsequently, in Step S20, the CPU 61 (input reception module 507) determines whether or not a selection operation on the illustration image of the commodity candidate is received. If a selection operation on the illustration image of the commodity candidate is received (Yes in Step S20), the processing of the CPU 61 shifts to Step S21. In Step S21, the CPU 61 (commodity presentation module 506) causes the display device 106 to display the confirmation screen A1. On the other hand, if such a selection operation is not received (No in Step S20), the processing of the CPU 61 returns to Step S12. Note that, in Step S18, also if it is determined that there is not a commodity candidate (No in Step S18), the processing of the CPU 61 returns to Step S12.

Next, in Step S23, the CPU 61 determines whether or not to terminate the work of the commodity registration, for example. If it is determined by the CPU 61 not to terminate (to continue) the work of the commodity registration (No in Step S23), the processing of the CPU 61 returns to Step S12. The CPU 61 returns the processing to Step S12 and continues commodity registration processing. On the other hand, if it is determined to terminate the work of the commodity registration, the CPU 61 notifies the CPU 161 of the commodity reading apparatus 101 about termination of the work of the commodity registration via the connection interface 175. The CPU 161 determines whether or not there is a notification or the like about termination of the work of the commodity registration from the POS terminal 11 (CPU 61). If the CPU 161 determines that there is a notification about termination of the work of the commodity registration, the CPU 161 causes the image pickup device 164 to continue the image pickup operation. On the other hand, if it is determined by the CPU 61 to terminate the work (Yes in Step S23), the processing of the CPU 61 shifts to Step S24. In Step S24, the CPU 61 (image capturing module 501) outputs a pickup OFF signal to the image pickup device 164 and terminates the image pickup by the image pickup device 164.

Next, in Step S25, the CPU 61 (sales registration module 509) reads out a commodity type, a unit price, and the like from the PLU file F1 on the basis of the above-mentioned saved commodity ID and number of sales (see Step S22). On the basis of the commodity type, the unit price, and the like, the CPU 61 registers, in the sales master file, sales of commodities G which are read by the commodity reading apparatus 101.

In the above-mentioned manner, the POS terminal 11 calculates the degree of similarity between the feature amount extracted from the image of the object whose image is picked up by the image pickup device 164 and each of the feature amounts registered in the PLU file F1 and the dictionary file F2 for exclusion. Then, if the degree of similarity to the exclusion object is dominant, recognition of the object whose image is picked up by the image pickup device 164 is canceled. Or, if the degree of similarity to the reference commodity is dominant, recognition of the object whose image is picked up by the image pickup device 164 is performed. With this, it is possible to reduce occurrence of erroneous recognition where the exclusion object is recognized as the reference commodity, and hence it is possible to enhance the accuracy of recognition of the generic object recognition (object recognition).

Figure 13:
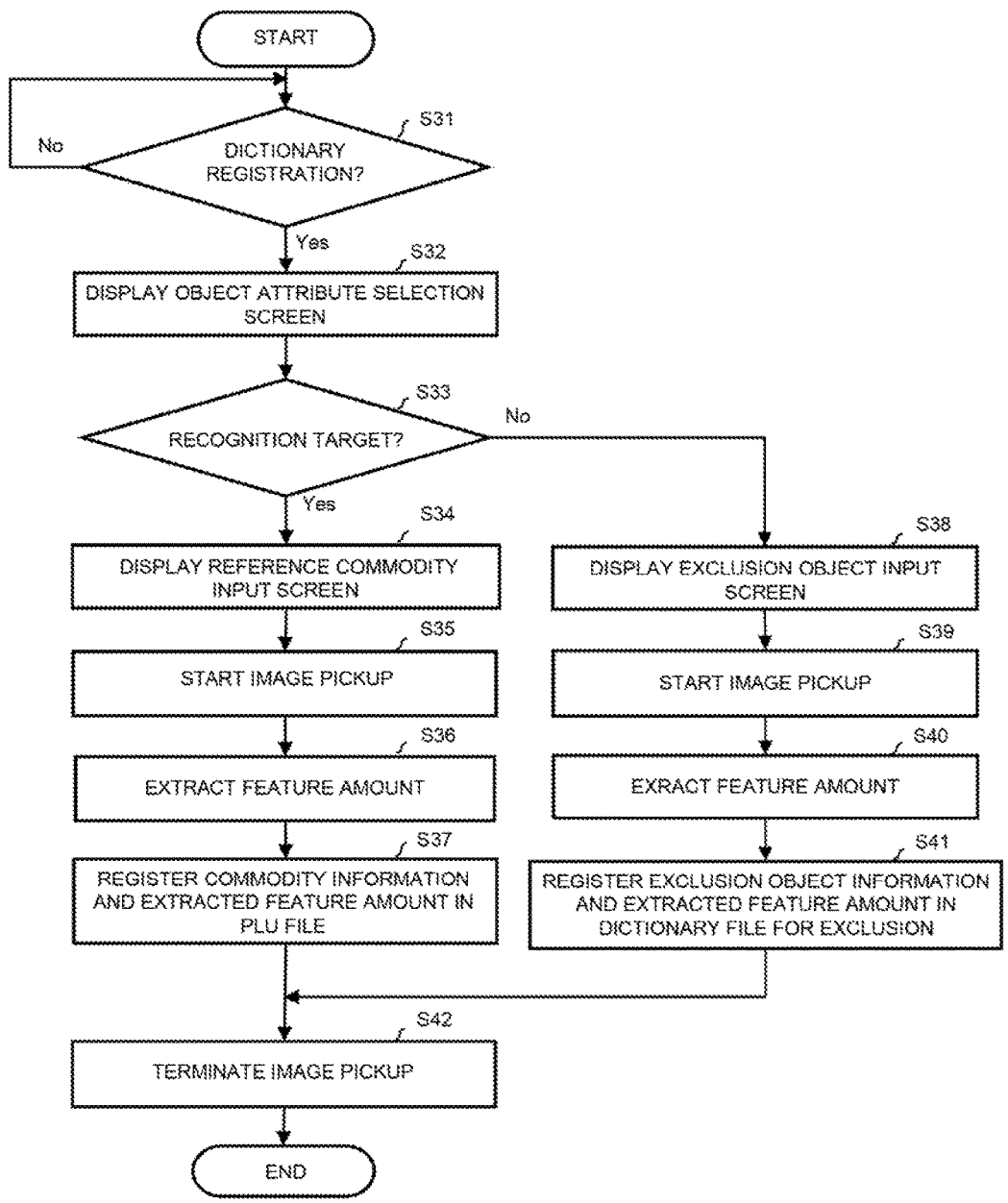
FIG. 13 is a flowchart showing an example of dictionary registration processing executed by the POS terminal of the embodiment.

Next, with reference to FIG. 13, dictionary registration processing executed by the POS terminal 11 will be described. Here, FIG. 13 is a flowchart showing an example of the dictionary registration processing executed by the POS terminal 11. The CPU 61 operates in accordance with the program PR2 for dictionary registration processing, to thereby execute the dictionary registration processing.

First of all, in Step S31, the CPU 61 (dictionary registration module 511) determines whether or not an instruction of dictionary registration is received via the keyboard 107 of the operation device 104 or the like. The CPU 61 waits until an instruction of the dictionary registration is received (No in Step S31). If it is determined that the instruction of the dictionary registration is received (Yes in Step S31), the processing of the CPU 61 shifts to Step S32. In Step S32, the CPU 61 causes the display device 106 to display the object attribute selection screen A3 (see FIG. 9) for allowing selection of an attribute of an object that is a registration target.

The object attribute selection screen A3 is displayed and the attribute is selected via the object attribute selection screen A3. Then, the processing of the CPU 61 shifts to Step S33. In Step S33, the CPU 61 (dictionary registration module 511) determines whether or not the selected attribute is the recognition target, in the other words, whether or not the selection button A31 is operated. If the recognition target is selected (Yes in Step S33), the processing of the CPU 61 shifts to Step S34. In Step S34, the CPU 61 (dictionary registration module 511) causes the display device 106 to display the reference commodity input screen A4 (see FIG. 10) for allowing the operator to input the information about the reference commodity.

When an operation on the "Set" button A46 is received after the commodity information is input in the reference commodity input screen A4, the CPU 61 (dictionary registration module 511) saves the input commodity information in, for example, the RAM 63. Next, in Step S35, the CPU 61 causes the image pickup device 164 to start image pickup. That is, the dictionary registration module 511 cooperates with the image capturing module 501, to thereby cause the image pickup device 164 to start the image pickup operation. Note that, in response to reception of the operation on the "Set" button A46, the CPU 61 (dictionary registration module 511) may cause the display device 106 to display a notice for prompting the operator to bring the object (reference commodity) in front of the reading window 103.

Subsequently, in Step S36, the CPU 61 extracts a feature amount from an inclusion region of the object included in the picked-up image. The dictionary registration module 511 cooperates with object detection module 502 and the feature amount extraction module 503, to thereby extract the feature amount from the inclusion region of the object included in the picked-up image. Next, in Step S37, the dictionary registration module 511 registers the commodity information (see Step S34) previously saved in the RAM 63 and the extracted feature amount (see Step S36) in the PLU file F1 as new registration information. After the new registration information is registered in the PLU file F1, the processing of the CPU 61 shifts to Step S42.

On the other hand, in Step S33, if the exclusion target is selected (No in Step S33), the processing of the CPU 61 shifts to Step S38. In Step S38, the CPU 61 (dictionary registration module 511) causes the display device 106 to display the exclusion object input screen A5 (see FIG. 11) for allowing the operator to input information about the exclusion object.

When the operation of the "Set" button A53 is received after the exclusion object information is input via the exclusion object input screen A5, the CPU 61 (dictionary registration module 511) saves the input exclusion object information in, for example, the RAM 63. Next, in Step S39, the CPU 61 causes the image pickup device 164 to start the image pickup operation. That is, the dictionary registration module 511 cooperates with the image capturing module 501, to thereby cause the image pickup device 164 to start the image pickup operation. Note that, in response to reception of the operation of the "Set" button A53, the CPU 61 (dictionary registration module 511) may cause the display device 106 to display a notice for prompting the operator to bring the object (exclusion object) in front of the reading window 103.

Subsequently, in Step S40, the CPU 61 extracts a feature amount from an inclusion region of the object included in the picked-up image. That is, the dictionary registration module 511 cooperates with the object detection module 502 and the feature amount extraction module 503, to thereby extract the feature amount from the inclusion region of the object included in the picked-up image. Next, in Step S41, the CPU (dictionary registration module 511) registers the exclusion object information (see Step S38) previously saved in the RAM 63 and the extracted feature amount (see Step S40) in the dictionary file F2 for exclusion as new registration information. After the new registration information is registered in the dictionary file F2 for exclusion, the processing of the CPU 61 shifts to Step S42.

Then, in Step S42, the CPU 61 causes the image pickup device 164 to terminate the image pickup operation. That is, the dictionary registration module 511 cooperates with the image capturing module 501, to thereby cause the image pickup device 164 to terminate the image pickup operation. When the image pickup device 164 terminates the image pickup operation, this dictionary registration processing is terminated.

In the above-mentioned manner, when the instruction of the dictionary registration is received, the POS terminal 11 receives the attribute of the object to be registered in the dictionary via the object attribute selection screen A3. Then, the POS terminal 11 registers the commodity information or the exclusion object information of the reference commodity input via various screens in the dictionary corresponding to the attribute of that object (PLU file F1 or dictionary file F2 for exclusion) together with the feature amount extracted from the picked-up image of a newly registered object (reference commodity or exclusion object). With this, the operator can register the new object (reference commodity or exclusion object) in the PLU file F1 or the dictionary file F2 for exclusion without directly operating the PLU file F1 or the dictionary file F2 for exclusion. Thus, the operator can easily register the commodity information of the reference commodity or the exclusion object information in the PLU file F1 or the dictionary file F2 for exclusion.

Note that, in the above-mentioned embodiment, the POS terminal 11 of the check-out system 1 includes the functional units of the CPU which are involved in the dictionary registration processing (image capturing module 501, object detection module 502, feature amount extraction module 503, dictionary registration module 511, and the like), the PLU file F1, and file F2 for exclusion. In addition, the commodity reading apparatus 101 of the check-out system 1 includes the image pickup device 164, the display device 106, and the like. Alternatively, another information processing apparatus such as a store computer SC and a personal computer (PC) may include the above-mentioned configurations.

Further, in the above-mentioned embodiment, in the dictionary registration processing, the display device 106 is caused to display the reference commodity input screen A4 or the exclusion object input screen A5 after the attribute of the object to be newly registered in the dictionary is selected. With this screen display, the commodity information or the exclusion object information is input by the operator. Alternatively, for example, image pickup of the object and extraction of the feature amount may be performed immediately after the object to be newly registered in the dictionary is selected. In this case, after image pickup of the object and extraction of the feature amount are performed, the commodity information or the exclusion object information about the newly registered object may be input into the PLU file F1 or the dictionary file F2 for exclusion.

Further, the programs to be executed by the information processing apparatus according to the above-mentioned embodiment are provided by being incorporated in a storage medium (ROM or storage unit) of this information processing apparatus in advance. For this, the programs to be executed by the information processing apparatus may be provided by being recorded as a file in an installable form or an executable form on a recording medium readable by a computer. The recording medium includes a CD-ROM, a flexible disk (FD), a CD-R, a digital versatile disk (DVD), and the like. In addition, the storage medium is not limited to a medium independent of the computer or an incorporating system. The storage medium also includes a storage medium in which programs transferred via a LAN, the Internet, or the like are downloaded and stored or temporarily stored.

Further, the programs to be executed by the information processing apparatus according to the above-mentioned may be provided by being stored in a computer connected to a network such as the Internet and downloaded via the network. Further, the programs to be executed by the information processing apparatus may be provided or distributed via the network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus that recognizes a commodity and processes information about the recognized commodity, comprising:

an image pickup device that picks up an image of an object within an image pickup range and outputs the picked-up image for recognizing a commodity;

a storage device that stores a first dictionary file in which a feature amount of each of a plurality of reference commodities to be recognition targets is registered and a second dictionary file in which a feature amount of each of a plurality of exclusion objects to be excluded from the recognition targets is registered;

an operation device that receives selection as to whether to register the feature amount of the reference commodity in the first dictionary file or register the feature amount of the exclusion object in the second dictionary file; and a processor that
extracts a feature amount of the object included in the picked-up image output by the image pickup device, and
registers the extracted feature amount in the first dictionary file or the second dictionary file in accordance with the selection received by the operation device.

2. The information processing apparatus according to claim 1, wherein
the processor causes the image pickup device to operate if the selection is received by the operation device.

3. The information processing apparatus according to claim 1, wherein
the operation device includes a display device that displays a selection screen for receiving the selection.

4. The information processing apparatus according to claim 3, wherein
the operation device further receives an instruction of registration of a feature amount in the first dictionary file or the second dictionary file.

5. The information processing apparatus according to claim 4, wherein
the processor
causes the display device to display the selection screen if the instruction of registration is received by the operation device, and
determines whether to register the feature amount of the reference commodity in the first dictionary file or register the feature amount of the exclusion object in the second dictionary file, via the selection screen.

6. The information processing apparatus according to claim 5, wherein
the display device displays an input screen for inputting information about the object whose image is picked up by the image pickup device.

7. The information processing apparatus according to claim 6, wherein
the processor registers
information about the object, which is input via the input screen, in association with the feature amount extracted by the processor in the first dictionary file or the second dictionary file in accordance with the selection received by the operation device.

8. The information processing apparatus according to claim 6, wherein
the input screen displayed by the display device displays
a first input screen for inputting information about the reference commodity, and
a second input screen for inputting information about the exclusion object.

9. The information processing apparatus according to claim 8, wherein
the processor
causes the display device to display the second input screen if the processor determines to register the feature amount of the exclusion object in the second dictionary file, and
receives the information about the exclusion object via the second input screen.

10. The information processing apparatus according to claim 9, wherein
the processor registers the received information about the exclusion object in association with the extracted feature amount in the second dictionary file.

11. The information processing apparatus according to claim 1, wherein
the processor
detects an inclusion region of the object included in the picked-up image, and
extracts a feature amount of the object from the detected inclusion region.

12. The information processing apparatus according to claim 1, wherein
the image pickup device successively picks up images of the object within the image pickup range and outputs a plurality of picked-up images in series.

13. The information processing apparatus according to claim 12, wherein
the processor
extracts a predetermined number of feature amounts from the plurality of picked-up images, and
registers the extracted predetermined number of feature amounts in the first dictionary file or the second dictionary file in accordance with the selection received by the operation device.

14. An information processing method for an information processing apparatus, the information processing apparatus including an image pickup device that picks up an image of an object within an image pickup range and outputs the picked-up image for recognizing a commodity, a storage device that stores a first dictionary file in which a feature amount of each of a plurality of reference commodities to be recognition targets is registered and a second dictionary file in which a feature amount of each of a plurality of exclusion objects to be excluded from the recognition targets is registered, an operation device that receives selection as to whether to register the feature amount of the reference commodity in the first dictionary file or register the feature amount of the exclusion object in the second dictionary file, and a processor that extracts a feature amount of the object included in the picked-up image output by the image pickup device, and registers the extracted feature amount in the first dictionary file or the second dictionary file in accordance with the selection received by the operation device, the information processing method comprising:
extracting a feature amount of the object included in the picked-up image output by the image pickup device; and
registering the extracted feature amount in the first dictionary file or the second dictionary file in accordance with the selection received by the operation device.

* * * * *